US012795354B2

(12) United States Patent
Baabu

(10) Patent No.: US 12,795,354 B2
(45) Date of Patent: Nov. 10, 2026

(54) CLASSIFICATION AND TRANSMISSION OF DATA FOR DATA COMPLIANCE

(71) Applicant: Honeywell International Inc., Charlotte, NC (US)

(72) Inventor: Kumaresh Baabu, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 77 days.

(21) Appl. No.: 19/049,187

(22) Filed: Feb. 10, 2025

(65) Prior Publication Data

US 2026/0238995 A1 Aug. 13, 2026

(51) Int. Cl.
*H04W 12/02* (2009.01)
*H04W 12/63* (2021.01)

(52) U.S. Cl.
CPC .......... *H04W 12/02* (2013.01); *H04W 12/63* (2021.01)

(58) Field of Classification Search
CPC .............................. H04W 12/02; H04W 12/63
See application file for complete search history.

(56) References Cited

U.S. PATENT DOCUMENTS 11,159,551 B2 * 10/2021 Lewis ................. G06F 16/2282
2020/0259852 A1 * 8/2020 Wolff ....................... G06N 7/01
2023/0185939 A1 * 6/2023 Cam-Winget ........ G06F 16/144 726/1

* cited by examiner

*Primary Examiner* — Matthew T Henning
(74) *Attorney, Agent, or Firm* — Alston & Bird LLP

(57) ABSTRACT

Devices, methods, and systems for classification and transmission of data for data compliance include analyzing, by a machine learning model of an edge computing device, data received by the edge computing device from a terminal device for data attributes and metadata included with the data, where the metadata includes a geolocation tag, classifying, by the machine learning model, the data as sensitive data based on the data attributes and the geolocation tag in the metadata indicating a geographic origin of the data includes a compliance requirement for privatizing the data, in response to the data being classified as sensitive data, privatizing, by the edge computing device, the data, and transmitting, by the edge computing device, the privatized data to a remote computing device.

20 Claims, 4 Drawing Sheets

CLASSIFICATION AND TRANSMISSION OF DATA FOR DATA COMPLIANCE

TECHNICAL FIELD

The present disclosure relates generally to devices, methods, and systems for classification and transmission of data for data compliance.

BACKGROUND

As data is generated, transmitted, and stored, concerns regarding how this data is handled, stored, and shared has become an issue. Data privacy regulations, which can dictate how data handled, stored, and shared, have been enacted in order to protect information in this data.

Data privacy can safeguard personal information from unauthorized access and/or distribution. For example, sensitive personal information, such as medical data, financial data, personal identification information, and other types of data can be safeguarded according to data privacy compliance regulations.

DETAILED DESCRIPTION

Figure 1:
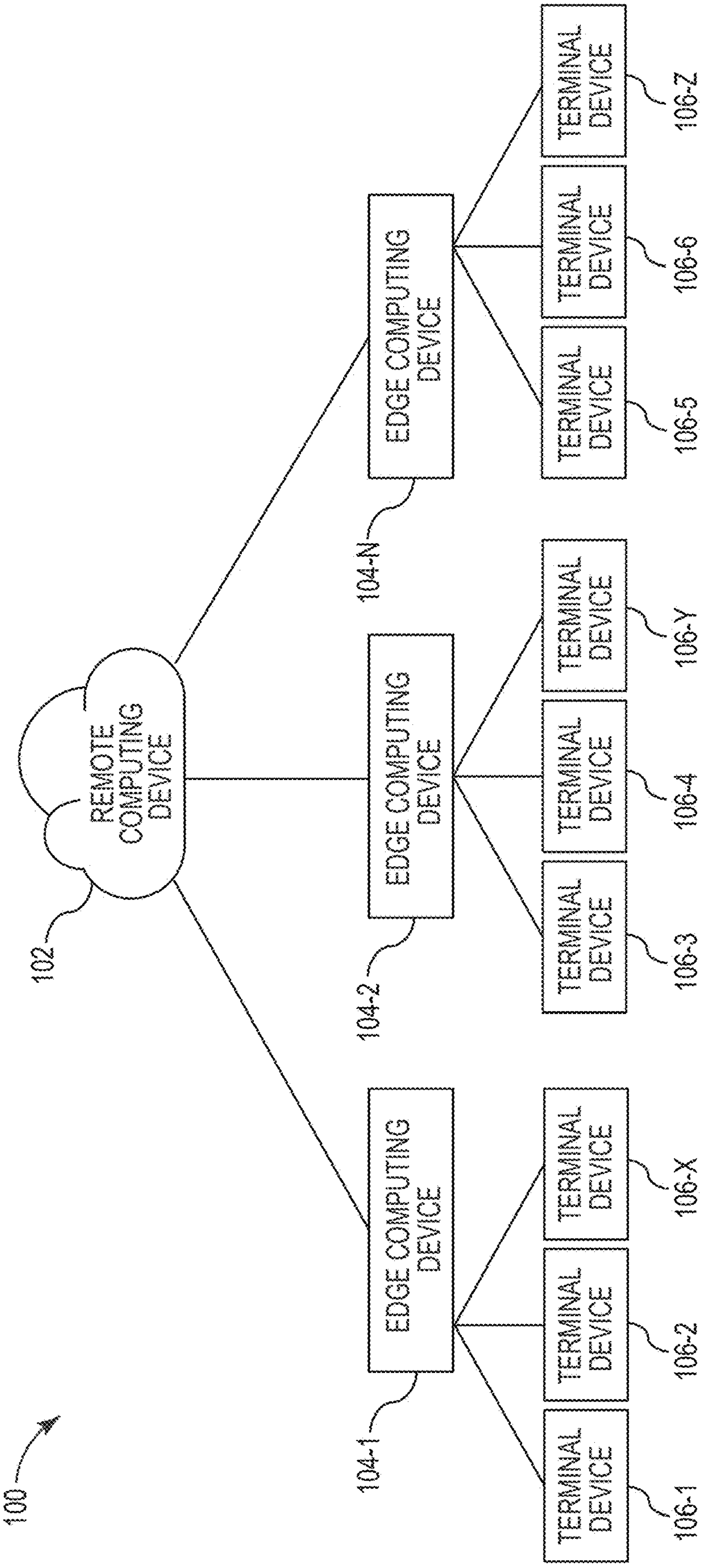
FIG. 1 illustrates a block diagram of an example of a system for classification and transmission of data for data compliance in accordance with one or more embodiments.

Devices, methods, and systems for classification and transmission of data for data compliance are described herein. One method includes analyzing, by a machine learning model of an edge computing device, data received by the edge computing device from a terminal device for data attributes and metadata included with the data, wherein the metadata includes a geolocation tag, classifying, by the machine learning model, the data as sensitive data based on the data attributes and the geolocation tag in the metadata indicating a geographic origin of the data includes a compliance requirement for privatizing the data, in response to the data being classified as sensitive data, privatizing, by the edge computing device, the data, and transmitting, by the edge computing device, the privatized data to a remote computing device.

As mentioned above, a risk of unauthorized access and/or distribution of data can be present as data is generated, collected, and/or transmitted. Interception of data, data breaches, identity theft, etc. can result in sensitive data being disclosed.

In order to combat this, data privacy compliance requirements can provide a measure of protection for sensitive data. For example, data privacy regulations can force compliance of organizations that collect, transmit, and/or store data that may include sensitive data. While these regulations exist, they may vary from jurisdiction to jurisdiction. For example, the United States (or particular regions therein) may have data privacy regulations that differ from the United Kingdom. Non-compliance with these regulations can result in financial penalties and/or damage to an organization's reputation.

Organizations that collect, transmit, and/or store data may utilize edge computing ecosystems. Edge computing devices are computing hardware that are close to a source of data generation. These edge computing devices can receive, process, and/or analyze data from terminal devices, reducing a need to transfer large amounts of data to a centralized server system (e.g., such as a cloud-based computing system). Since edge computing devices can reduce the transmission of large data and the workload of processing such data, edge devices can help to reduce bandwidth consumption and latency issues as compared to previous approaches.

However, as mentioned above, transmission of data from an edge device to a centralized server system in an edge computing ecosystem can risk disclosure of sensitive data in previous approaches. Disclosure of this sensitive data can run afoul of data privacy regulations and cause financial and reputational harm to the organization collecting, transmitting, and/or storing the data.

Additionally, edge computing ecosystems may be deployed in a number of different geographic locations that may include different compliance requirements, as mentioned above. Ensuring compliance with data privacy compliance requirements in a number of geographic locations using previous approaches can be a challenge.

Classification and transmission of data for data compliance, according to the disclosure, can allow for the privatization of sensitive data before transmission from an edge computing device to a remote computing device, such as a centralized server system (e.g., a cloud-based computing system). A miniaturized machine learning model can be deployed on edge devices in an edge device computing ecosystem that can analyze data received from terminal devices for data attributes that may indicate sensitive data, such as, for instance, personal information (e.g., medical data, financial data, etc.) and/or personal identification information, and determine a geographic origin of the data using metadata (e.g., a geolocation tag) included with the data. The machine learning model can analyze the data using natural language processing and/or computer vision, for example.

This data can be classified as sensitive data or non-sensitive data based on the data attributes and handled according to region-specific regulatory requirements. For example, sensitive data can be privatized (e.g., by masking, encryption, pseudonymization or anonymization, and the like) according to compliance requirements specific to the geographic location from which the data originated (e.g., as indicated by the geolocation tag). The privatized data can then be transmitted to the remote computing device. If the data is classified as non-sensitive, it can be transmitted to the remote computing device in the same state in which it was received from the terminal device (e.g., without being privatized).

In order to privatize the data according to the location specific compliance requirements, the machine learning model can be trained to handle data from multiple geographic locations each having different corresponding compliance requirements. Accordingly, classification and transmission of data for data compliance, according to the disclosure, can allow for compliance with data privacy regulations by ensuring data sovereignty while also benefiting from the reduced bandwidth and latency of an edge computing ecosystem. This approach can reduce the risk of financial penalties and reputational damage by ensuring sensitive data is handled according to regulatory compliance requirements, no matter the geographic location from which the data originated, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 404 in FIG. 4.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designators "N", "X", "Y", and "Z", as used herein, particularly with respect to reference numerals in the drawings, indicates that a number of the particular feature so designated can be included with a number of embodiments of the present disclosure.

FIG. 1 illustrates a block diagram of an example of a system 100 for classification and transmission of data for data compliance in accordance with one or more embodiments. The system 100 can include a remote computing device 102, edge computing devices 104-1, 104-2, 104-N (referred to collectively herein as edge computing devices 104), and terminal devices 106-1, 106-2, 106-X, 106-3, 106-4, 106-Y, 106-5, 106-6, and 106-Z (referred to collectively herein as terminal devices 106).

As mentioned above, edge computing systems can be deployed in different areas in order to bring computation and data storage closer to sources of data, as compared with a traditional cloud computing environment. For example, the system 100 can utilize edge computing devices 104 in order to receive, process, and/or store data received from terminal devices 106, respectively. The system 100, as an edge computing system, can allow for edge computing devices 104 to analyze, store, and/or transmit data functioning as devices that are physically closer to sources of data (e.g., terminal devices 106), which can reduce latency and cost (e.g., as less data is transmitted between an edge computing device and a remote computing device), as well as improve data sovereignty (e.g., as data is processed at an edge computing device instead of transmitted to a remote computing device), as compared to traditional cloud computing environments in which terminal devices transmit data to a remote computing device directly. As an example, edge computing devices 104 may be located at the same physical location (e.g., the same building or facility) as terminal devices 106, and remote computing device 102 may located at a different physical location than edge computing devices 104 and terminal devices 106. Both the edge computing devices 104 and the remote computing device 102 can be computing devices.

As used herein, the term "computing device" refers to an electronic system having a processing resource, memory resource, and/or an application-specific integrated circuit (ASIC) that can process information. Examples of computing devices can include, for instance, a laptop computer, a notebook computer, a desktop computer, an All-In-One (AIO) computing device, networking equipment (e.g., router, switch, etc.), and/or a mobile device, among other types of computing devices.

As used herein, an edge computing device can be a computing device that exists between a cloud computing environment (e.g., remote computing device 102) and data generation devices (e.g., terminal devices 106). The edge computing devices 104 can transmit/receive data from the terminal devices 106, analyze, and/or store such data, as well as transmit/receive data from the remote computing device 102. For example, the edge computing device 104-1 can receive data including personal identifying information for a person from terminal devices 106-1, 106-2, and/or 106-X. In other examples, the edge computing device 104-1 can receive medical data from terminal devices 106-3, 106-4, and/or 106-Y, and the edge computing device 104-N can receive data including financial data from terminal devices 106-5, 106-6, and/or 106-Z.

Although the examples given of the types of data described above include personal identifying information, medical data, and/or financial data, embodiments are not so limited. For example, terminal devices 106 can capture any other type of data (e.g., Internet-of-Things (IoT) data, smart camera data, autonomous vehicle data, wearable device data, industrial robot data, mobile device data, etc.) and transmit/receive such data to/from edge computing devices 104, respectively.

As mentioned above, the terminal devices 106 can be devices that capture and transmit data to the edge computing devices 104. As used herein, a terminal device is a computing device that can capture data and transmit the captured data for processing and/or analysis. Examples of terminal devices 106 can include sensors, IoT devices, radio frequency identification (RFID) tags, cameras, mobile devices, Internet-connected programmable logic controllers, smart home devices, and/or any other device that can capture and transmit data for processing and/or analysis. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

Accordingly, use of terminal devices 106 can result in the capture of a large amount of data. As mentioned above, this data can be transmitted to respective edge computing devices 104 for analysis and/or storage. An edge computing ecosystem, such as the system 100 illustrated in FIG. 1, can utilize the edge computing devices 104 to analyze, store, and/or transmit data received from terminal devices 106, as opposed to terminal devices 106 transmitting large amounts of data directly to a remote computing device (e.g., remote computing device 102) in a typical cloud computing environment utilized in previous approaches.

As illustrated in the system 100 of FIG. 1, the remote computing device 102 can be remotely located from the edge computing devices 104 and the terminal devices 106. In some examples, the remote computing device 102 can be a computing device included as part of a cloud-computing environment. For instance, the remote computing device 102 can be a computing device operating as part of a cloud computing environment remotely located from the edge computing devices 104 and can receive data from the edge computing devices 104 via a network (not shown in FIG. 1 for simplicity and so as not to obscure embodiments of the present disclosure).

The edge computing devices 104 can be connected to the remote computing device 102 and/or to the terminal devices 106 via a wired and/or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

In some examples, the data received by the remote computing device 102 can be classified as sensitive data and privatized by the edge computing devices 104 based on the data type of the data, the attributes of the data, and the geographic origin of the data, as is further described in connection with FIGS. 2 and 3. Privatizing such data can ensure data compliance with data privacy regulations in multiple geographic locations in which the system 100 may be deployed, reducing the risk of financial penalties and reputational damage as mentioned above.

Figure 2:
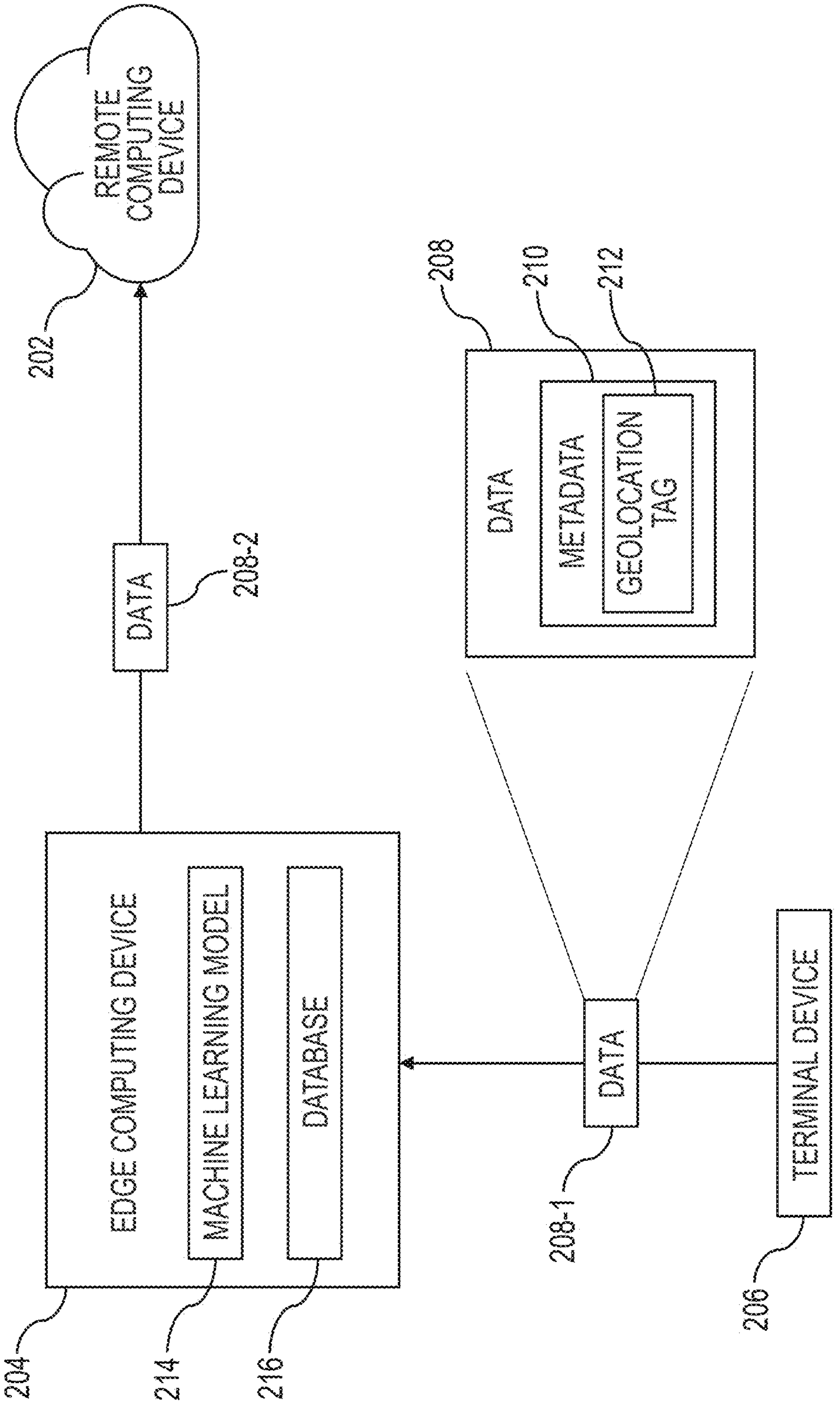
FIG. 2 illustrates an example of an edge computing device for classification and transmission of data for data compliance in accordance with one or more embodiments.

FIG. 2 illustrates an example of an edge computing device 204 for classification and transmission of data for data compliance in accordance with one or more embodiments. The edge computing device 204 can be in communication with a remote computing device 202 and a terminal device 206, as illustrated in FIG. 2 and previously described in connection with FIG. 1. Although a single instance of an edge computing device 204 is illustrated in FIG. 2 and is in communication with (e.g., connected to) a single terminal device 206, embodiments are not so limited. For example, as previously illustrated in FIG. 1, the edge computing device 204 can be in communication with multiple terminal devices 206, and the remote computing device 202 can be in communication with multiple edge computing devices 204 and can utilize the methods described herein for classification and transmission of data for data compliance.

As previously described in connection with FIG. 1, the edge computing device 204 can receive, analyze, store, and/or transmit data 208-1 received from a terminal device 206. The edge computing device 204 can analyze the data 208-1 and classify the data 208-1 as sensitive or non-sensitive in order to ensure data compliance with data privacy regulations in multiple different geographic areas, as is further described herein.

For example, the terminal device 206 can be a sensor. The terminal device 206 can, in some examples, be utilized in an environment in which data is captured by the terminal device 206. The data may, in some instances, include sensitive data such as personal identifying information, financial information, medical information, etc. Sensitive data, if incorrectly handled, may run afoul of data privacy regulations. The edge computing device 204 can classify the data 208-1 to ensure compliance with data privacy regulations, as is further described herein.

As mentioned above, the terminal device 206 can capture data 208-1 and transmit data 208-1 to the edge computing device 204. As illustrated in FIG. 2, the data 208-1 can include data (e.g., information captured by the terminal device 206), as well as metadata 210 associated with the data captured by the terminal device 206.

The metadata 210 can include information that describes other data. As illustrated in FIG. 2, in one example the metadata 210 can include a geolocation tag 212. The geolocation tag 212 can be metadata that includes geographic information about the data captured by the terminal device 206. For example, the terminal device 206 can be a healthcare device that captures data 208-1 that is medical information about a person; the medical information can include an associated geolocation tag 212 that includes latitude and longitude coordinates, place names, and/or other positional data that indicates the data 208-1 was captured in the United States.

The data 208-1 can be transmitted from the terminal device 206 to the edge computing device 204 in a first state. In the first state, the data 208-1 does not have any sensitive data included therein privatized. If the data 208-1 includes sensitive data, the edge computing device 204 can classify it as such and privatize the data 208-1 according to the method as is further described herein.

The edge computing device 204 can determine whether the data 208-1 includes sensitive data by analyzing the data 208-1. As illustrated in FIG. 2, the edge computing device 204 can include a machine learning model 214. The edge computing device 204 can analyze, by the machine learning model 214, the data 208-1 received from the terminal device 206 for data attributes and metadata 210 included with the data. Data attributes can be, for instance, a characteristic or a property that describes the data 208-1. For example, the data attributes can include a structure of the data (e.g., structured data or unstructured data), a data type of the data, etc.

The edge computing device 204 can analyze the data 208-1 via the machine learning model 214. As used herein, a machine learning model refers to a computing object trained on training data that can find patterns or make decisions based on an analysis of a previously unseen dataset. The machine learning model 214 can analyze the data 208-1 as an input and generate an output based on patterns detected in the data 208-1. Based on the analysis, the machine learning model 214 can generate an output that includes patterns detected by the machine learning model 214, including data attributes such as the structure of the data 208-1, a data type of the data 208-1, etc., as is further described herein.

As mentioned above, the machine learning model 214 can be trained with training data prior to deployment on the edge computing device 204. Training the machine learning model 214 can include utilizing training data which includes a target attribute. The machine learning model 214 can execute by analyzing the training data and generate an output based on the execution of the machine learning model 214 on the training data, calculate an error of the machine learning model 214 relative to the target attribute, and adjust parameters of the machine learning model 214 so as to reduce this error. This process can be repeated until the error is less than a threshold value. Training the machine learning model 214 can, therefore, teach the machine learning model

214 to find patterns in the training data that map the input data attributes to the desired target.

For example, the machine learning model 214 may be trained utilizing a training data set having non-sensitive data and target sensitive data, where the training data set can include different data attributes (e.g., structure of the data, data type, different geolocation tags, etc.). The machine learning model 214 can be trained in order to identify and classify sensitive data according to different rules (e.g., regulations corresponding to a geographic origin of the data, privatization method corresponding to the determined data type, etc.). In such a way, the machine learning model 214 can be trained to handle data from multiple geographic locations each having different corresponding compliance requirements. Accordingly, when deployed at the edge computing device 204, the machine learning model 214 can analyze multiple types of data received from the terminal device 206 (or other terminal devices not illustrated in FIG. 2) for data attributes and metadata 210 associated with the data 208-1.

In some examples, the machine learning model 214 can analyze the data 208-1 using natural language processing. For example, the machine learning model 214 can analyze the data 208-1 using rule-based, statistical, and/or a neural-based approach for data attributes and metadata 210 associated with the data 208-1.

In some examples, the machine learning model 214 can analyze the data 208-1 using computer vision. For example, the data 208-1 may include image(s) and/or video sourced from a camera associated with the terminal device 206, and the machine learning model 214 can analyze the data 208-1 using classification, recommendation, object detection, facial recognition, etc. for data attributes and metadata 210 associated with the data 208-1.

In some examples, the machine learning model 214 can be a miniaturized machine learning model. For instance, the edge computing device 204 may have limited computing hardware resources, and large language models can utilize relatively high processing, memory, and/or electrical resources to be executed effectively. For this reason, the machine learning model can be a miniaturized machine learning model to provide for application specific processing that can operate effectively utilizing the particular hardware, software, and power constraints. The miniaturized machine learning model can utilize a smaller number of parameters as compared to a standard large language model and thus, utilize less memory enabling them to be utilized on a device with limited memory and/or low power hardware.

As mentioned above, the data 208-1 can be in different data formats when received from the terminal device 206. In some examples, the data 208-1 can be unstructured data. For instance, the data 208-1 lacks a clear structure, and can include data such as emails, presentations, videos, images, etc. The machine learning model 214 can analyze the unstructured data 208-1 for data attributes and metadata 210, as described above.

In some examples, the data 208-1 can be structured data. For instance, the data 208-1 can include a predefined format (e.g., such as a database table with established rows and columns). Structured data can include data such as customer information (e.g., names, address, phone number, etc.), banking transaction information, product pricing on a website, inventory management data, web form results, point-of-sale data, structured query language (SQL) data, etc. The machine learning model 214 can analyze the structured data 208-1 for data attributes and metadata 210, as described above.

The edge computing device 204 can determine a data type of the data 208-1 based on the analyzed data. The data type can be, for example, a particular kind of data item defined by the values it can take. For example, the data type of the data 208-1 may be financial data, medical data, data having personal identification information of a person, among other data types. In some examples, data types may be defined by laws or regulations imposed by a geographic location in which the data 208-1 originated.

As an example, the machine learning model 214 can analyze the data 208-1 for data attributes included with the data 208-1. The data attributes can indicate the data 208-1 includes data about a customer, including spending habits such as types of goods purchased, amounts of goods purchased, as well as information relating to the customer's name and address. The edge computing device 204 can accordingly determine the data type of the data 208-1 to be data including personal identifying information.

Additionally, the edge computing device 204 can determine a geographic origin of the data 208-1 based on the geolocation tag 212. The geographic origin of the data 208-1 can be a geographic location where the data 208-1 was captured by the terminal device 206. The geographic location can be captured by the geolocation tag 212 included in the metadata 210 of the data 208-1, as previously described above.

Continuing with the example above, the machine learning model 214 can further analyze the data 208-1 for metadata 210 included with the data 208-1. The metadata 210 can include the geolocation tag 212 indicating the data 208-1 related to the customer's spending habits originated in the United States (e.g., was captured by a terminal device 206 located in the United States). Accordingly, the edge computing device 204 can determine the geographic origin of the data 208-1 to be the United States based on the geolocation tag 212 included in the metadata 210.

As mentioned above, the machine learning model 214 can be trained to analyze the data 208-1 for data attributes including a geographic origin of the data 208-1 based on a geolocation tag 212 included in metadata 210 of the data 208-1. Accordingly, the edge computing device 204 can determine the geographic origin of the data 208-1 based on the geolocation tag 212. Utilizing the geographic origin, the machine learning model 214 can determine whether a compliance requirement for privatizing the data exists for the determined geographic origin of the data 208-1. In one example, the machine learning model 214 can determine that, based on the geographic origin of the data 208-1 being a first type of data from a first geographic region, a compliance requirement exists for the first type of data. In another example, the machine learning model 214 can determine that, based on the geographic origin of the data 208-1 being a second type of data (different from the first type of data) from a second geographic region (different from the first geographic region), a compliance requirement (which can be the same compliance requirement or a different compliance requirement) exists for the second type of data.

Continuing with the example from above, the edge computing device 204 can have determined the data type 208-1 to be data including personal identifying information, and that the geographic origin of the data 208-1 is the United States based on the geolocation tag 212 included in the metadata 210. The machine learning model 214 can accordingly determine, based on the data including personal identifying information and the geographic origin of the data 208-1 is the United States, that a compliance requirement exists for the data 208-1.

Accordingly, the machine learning model 214 can classify the data 208-1 as sensitive data based on the data attributes in response to the geographic origin of the data 208-1 indicating a compliance requirement for privatizing the data 208-1. Sensitive data can be, for instance, data that is confidential, data that may identify a person or organization if disclosed, data defined as such by regulation/statute/law, etc. For example, the machine learning model 214 can classify the data as sensitive in response to the data 208-1 including personal identifying information (e.g., a name, biometric data, personal identification number such as a social security number or other uniquely assigned government identification number, etc.), financial information, and/or medical information, etc. and the geographic origin of the data 208-1 indicating a compliance requirement for privatizing the data.

Continuing with the example above, the edge computing device 204 can have determined the data type 208-1 to be data including personal identifying information, that the geographic origin of the data 208-1 is the United States based on the geolocation tag 212 included in the metadata 210, and the machine learning model 214 can have determined that a compliance requirement exists for the data 208-1. Accordingly, the machine learning model 214 can classify the data 208-1 as sensitive data.

In some examples, the machine learning model 214 can classify the entirety of the data 208-1 as sensitive data. However, embodiments are not so limited. For instance, in some examples, the machine learning model 214 can classify a subset of the data 208-1 (e.g., just the personal identifying information) as sensitive data.

Although the data 208-1 is described above as being classified by the machine learning model 214 as sensitive data, embodiments are not so limited. For instance, in some examples the machine learning model 214 can analyze the data 208-1 for data attributes indicating the data includes data about a customer including spending habits such as types of goods purchased and amounts of goods purchased and that such data originated in China, and the edge computing device 204 can determine that based on the geographic origin of the data 208-1, there is no compliance requirement for privatizing the data 208-1. Accordingly, in response to the geolocation tag 212 indicating the geographic origin of the data 208-1 does not include a compliance requirement, the edge computing device 204 can transmit the data 208-1 to the remote computing device 202 in a same state in which the data 208-1 was received from the terminal device 206. For example, the edge computing device 204 can transmit the data 208-1 to the remote computing device 202 without privatizing the data 208-1, as there is not a data compliance requirement for privatizing such data 208-1.

Continuing with the example above, the machine learning model 214 can classify the data 208-1 as sensitive data. The edge computing device 204 can log the instance of the data 208-1 being classified as sensitive data in a database 216. The database 216 can be a metadata database located locally at the edge computing device 204. In some examples, in response to the data 208-1 being classified as sensitive data, the edge computing device 204 can generate and transmit a notification. The notification can be transmitted to, for instance, another computing device (e.g., not illustrated in FIG. 2) to notify a user (e.g., an administrator or the like) of the instance of sensitive data.

In response to the data 208-1 being classified as sensitive data, the edge computing device 204 can privatize the data via a privatization method corresponding to the data type. As used herein, privatizing the data refers to converting data from a readable format to a non-readable format. Accordingly, privatizing the data 208-1 in response to the data 208-1 being classified as sensitive data can allow for the data 208-1 to be made confidential to guard against disclosure. The edge computing device 204 can utilize various privatization methods including masking, encryption, and/or pseudonymization or anonymization, as is further described herein.

In some examples, the edge computing device 204 can privatize the data 208-1 by masking the data 208-1. As used herein, data masking refers to hiding data by modifying its original letters and/or numbers. For example, the edge computing device 204 can mask the data 208-1 by substituting, shuffling, numeric variance, nulling out, masking, and/or other methods of data masking and/or combinations thereof of the original letters and/or numbers that make up the data 208.

In some examples, the edge computing device 204 can privatize the data 208-1 by encrypting the data 208-1. For example, the edge computing device 204 can encrypt the data 208-1 utilizing homomorphic encryption techniques, although embodiments are not limited to homomorphic encryption techniques.

In some examples, the edge computing device 204 can privatize the data 208-1 by pseudonymization of the data 208-1. For example, the edge computing device 204 can replace identifying information with artificial identifiers by performing, for instance, reversible transformations to the data 208-1.

In some examples, the edge computing device 204 can privatize the data 208-1 by anonymization of the data 208-1. For example, the edge computing device 204 can aggregate information in the data 208-1 so as to prevent specific events being linked to specific individuals.

As previously mentioned above, the privatization method for the data 208-1 can correspond to the type of data identified through the analysis by the machine learning model 214. For instance, in one example masking can be utilized for data 208-1 that includes personal identifying information, encryption can be utilized for data 208-1 that includes financial data, pseudonymization or anonymization can be utilized for data 208-1 that includes medical data, etc. Additionally, the privatization methods are not limited to the data types described above. For instance, certain geographic locations may mandate that a certain privatization method is utilized for a particular data type so that encryption is utilized for data 208-1 that includes medical data, masking is utilized for data 208-1 that includes financial data, etc.

Although the edge computing device 204 is described above as privatizing all of the data 208-1, embodiments are not so limited. For example, the edge computing device 204 can privatize only the sensitive portions of the data. For instance, utilizing the example above, the data 208-1 can include data about a customer, including spending habits such as types of goods purchased, amounts of goods purchased, as well as information relating to the customer's name and address, and the edge computing device 204 can privatize the customer's name and address via a privatization method corresponding to the data type but leave the remaining data (e.g., the types of goods purchased and amounts of goods purchased) in the same state as it was received from the terminal device 206.

Upon privatization, the data 208-2 can be in a different state than the state in which it was received from the terminal device 206 (e.g., data 208-1). The edge computing device 204 can accordingly transmit the privatized data (e.g., data 208-2) to the remote computing device 202.

Figure 3:
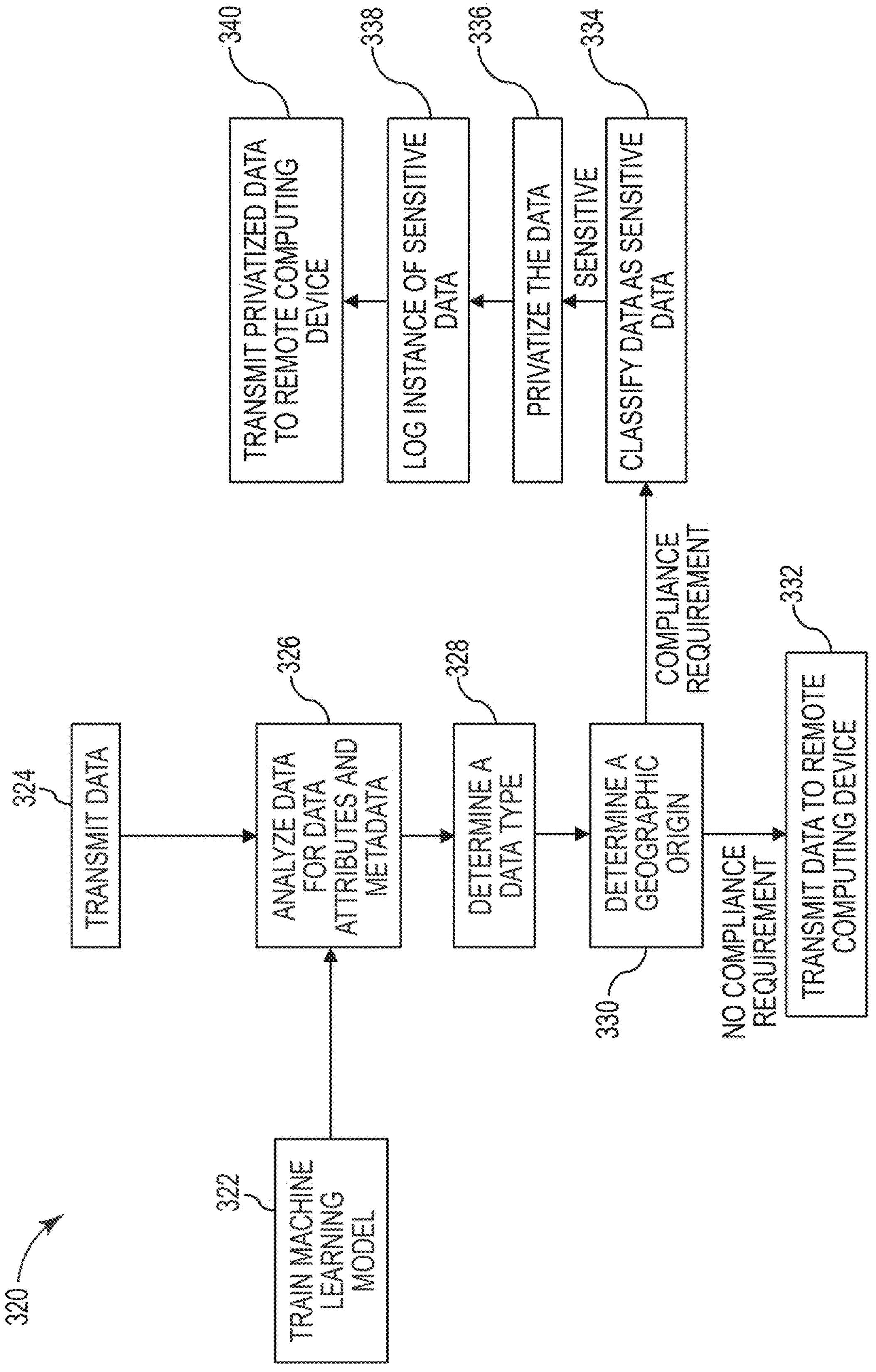
FIG. 3 illustrates an example of a method for classification and transmission of data for data compliance in accordance with one or more embodiments.

FIG. 3 illustrates an example of a method 320 for classification and transmission of data for data compliance in accordance with one or more embodiments. The method 320 can be performed by, for example, a terminal device 206, an edge computing device 204, and a remote computing device 202, previously described in connection with FIG. 2.

At 322, the method 320 can include training a machine learning model. The machine learning model can be, for example, a miniaturized machine learning model to be deployed on an edge computing device in an edge computing ecosystem. The machine learning model can be trained with training data prior to being deployed on the edge computing device such that the machine learning model can handle data from multiple geographic locations each having different corresponding compliance requirements, or no compliance requirements at all.

At 324, the method 320 includes transmitting, by a terminal device, data to an edge computing device. The edge computing device can receive the data from the terminal device. The data can include data (e.g., as structured data or unstructured data) captured by the terminal device, as well as metadata associated with the data captured by the terminal device. The metadata can include a geolocation tag that includes geographic information about the data captured by the terminal device.

At 326, the method 320 includes analyzing, by the machine learning model (e.g., using natural language processing, computer vision, and/or any other machine learning techniques), data received by the edge computing device from the terminal device for data attributes and metadata included with the data. The data attributes can include a structure of the data (e.g., structured data or unstructured data), a data type of the data, etc. The data attributes can indicate the data includes personal identifying information, financial information, medical information, or other types of information.

At 328, the method 320 includes determining a data type of the data. Based on the data attributes, the edge computing device can determine the data type to be, for example, data having personal identifying information, financial data, medical data, etc.

At 330, the method 320 includes determining a geographic origin of the data. For example, based on the geolocation tag included in the metadata in the received data, the edge computing device can determine the geographic origin of the data, which can be utilized to determine whether there are any compliance requirements associated with the geographic origin of the data and the data type.

At 332, in response to no data compliance requirements existing for the data type of the data, the method 320 includes transmitting the data as is to a remote computing device. For example, if no compliance requirements exist for the data type in the geographic location where the data was captured by the terminal device, there is no need to classify the data as sensitive and privatize it. As such, the edge computing device can transmit the data as is.

However, at 334, in response to a data compliance requirement existing for the data, the edge computing device can classify the data as sensitive data based on the data attributes and the geolocation tag in the metadata indicating the geographic origin of the data includes a compliance requirement for privatizing the data. Accordingly, at 336, the method 320 can include privatizing the data according to a particular privatization method. In some examples, the privatization method can correspond to the data type. Privatization methods can include, for instance, masking, encryption, and/or pseudonymization or anonymization, among other types of privatization methods.

At 338, the method 320 includes logging the instance of classification of sensitive data in a database. In some examples, the edge computing device can transmit a notification in response to the classification of sensitive data.

At 340, the method 320 includes transmitting, by the edge computing device, the privatized data to the remote computing device. The privatized data can be transmitted according to regulatory compliance requirements associated with the geographic location in which the data was captured, reducing the risk of financial penalties and reputation damage involved with mishandling sensitive data.

As previously mentioned above, as an example, the data can be captured by a terminal device in the European Union, where the data includes information about a medical patient, including health records, administrative data, and medical imaging information. In one example, at 324, the terminal device can transmit the data to an edge computing device and at 326, the method 320 can include analyzing, by a machine learning model of the edge computing device, the data for data attributes and metadata included with the data.

At 328, the method 320 can include determining a data type of the data. For example, based on the analysis by the machine learning model, the edge computing device can determine the data type of the data to be medical data based on the data including health records, administrative data, and medical imaging information. Additionally, at 330, the method 320 can include determining the geographic origin of the data to be the European Union based on a geolocation tag included in metadata of the data. The edge computing device can determine the European Union includes a compliance requirement for medical data.

Based on the data attributes indicating the data is medical data and the geolocation tag in the metadata indicating the European Union includes a compliance requirement for privatizing medical data, the machine learning model can classify the data as sensitive data at 334.

At 336, in response to the data being classified as sensitive data, the edge computing device can privatize the data. For example, based on European Union requirements that medical data be privatized by anonymization of the data, the edge computing device can privatize the data via anonymization techniques. At 338, the method 320 can include logging the instance of sensitive data in a database. Finally, at 340 the method 320 can include transmitting the privatized medical data to a remote computing device.

As another example, the data can be captured by a terminal device in the United States, where the data includes financial information about a consumer, including banking records, balance sheets, account numbers, etc. In one example, at 324, the terminal device can transmit the data to an edge computing device and at 326, the method 320 can include analyzing, by a machine learning model of the edge computing device, the data for data attributes and metadata included with the data.

At 328, the method 320 can include determining a data type of the data. For example, based on the analysis by the machine learning model, the edge computing device can determine the data type of the data to be financial data based on the data including banking records, balance sheets, and account numbers. Additionally, at 330, the method 320 can include determining the geographic origin of the data to be the United States based on a geolocation tag included in metadata of the data. The edge computing device can determine India includes a compliance requirement for financial data.

Based on the data attributes indicating the data is financial data and the geolocation tag in the metadata indicating the United States includes a compliance requirement for privatizing financial data, the machine learning model can classify the data as sensitive data at 334.

At 336, in response to the data being classified as sensitive data, the edge computing device can privatize the data. For example, based on American requirements that financial data be privatized by encryption of the data, the edge computing device can privatize the data via encryption techniques. At 338, the method 320 can include logging the instance of sensitive data in a database. Finally, at 340 the method 320 can include transmitting the privatized financial data to a remote computing device.

As another example, the data can be captured by a terminal device in India, where the data includes financial information about a consumer, including banking records, balance sheets, account numbers, etc. In one example, at 324, the terminal device can transmit the data to an edge computing device and at 326, the method 320 can include analyzing, by a machine learning model of the edge computing device, the data for data attributes and metadata included with the data.

At 328, the method 320 can include determining a data type of the data. For example, based on the analysis by the machine learning model, the edge computing device can determine the data type of the data to be financial data based on the data including banking records, balance sheets, and account numbers. Additionally, at 330, the method 320 can include determining the geographic origin of the data to be India based on a geolocation tag included in metadata of the data. The edge computing device can determine India includes a compliance requirement for financial data.

Based on the data attributes indicating the data is financial data and the geolocation tag in the metadata indicating India includes a compliance requirement for privatizing financial data, the machine learning model can classify the data as sensitive data at 334.

At 336, in response to the data being classified as sensitive data, the edge computing device can privatize the data. For example, based on Indian requirements that financial data be privatized by encryption of the data, the edge computing device can privatize the data via encryption techniques. At 338, the method 320 can include logging the instance of sensitive data in a database. Finally, at 340 the method 320 can include transmitting the privatized financial data to a remote computing device.

As another example, the data can be captured by a terminal device in California in the United States, where the data includes information about a customer, including spending habits such as types of goods purchased, amounts of goods purchased, financial information relating to the customer's transactions including payment method, as well as personal identifying information including the customer's full name and address. In one example, at 324, the terminal device can transmit the data to an edge computing device and at 326, the method 320 can include analyzing, by a machine learning model of the edge computing device, the data for data attributes and metadata included with the data.

At 328, the method 320 can include determining a data type of the data. For example, based on the analysis by the machine learning model, the edge computing device can determine the data to include multiple data types, including financial data based on the data including payment method information and personal identifying information based on the data including a customer's full name and address. Additionally, at 330, the method 320 can include determining the geographic origin of the data to be California in the United States based on a geolocation tag included in metadata of the data. The edge computing device can determine California includes compliance requirements for financial data and personal identifying information.

Based on the data attributes indicating the data includes financial data and personal identifying information and the geolocation tag in the metadata indicating California includes a compliance requirements for privatizing financial data and personal identifying information, the machine learning model can classify the data as sensitive data at 334.

At 336, in response to the data being classified as sensitive data, the edge computing device can privatize the data. For example, based on California's requirements that financial data be privatized by encryption of financial data and personal identifying information be privatized by masking personal identifying information, the edge computing device can privatize the financial data by encrypting the financial data, privatize the personal identifying information by masking the personal identifying information, and leaving the remaining portions of the data (e.g., the types of goods purchased and the amounts of goods purchased) as is (e.g., not privatized). At 338, the method 320 can include logging the instance of sensitive data in a database. Finally, at 340 the method 320 can include transmitting the data (e.g., the non-privatized data and the privatized financial data and personal identifying information) to a remote computing device.

As another example, the data can be captured by a terminal device in India, where the data includes log information for an autonomous vehicle. In one example, at 324, the terminal device can transmit the data to an edge computing device and at 326, the method 320 can include analyzing, by a machine learning model of the edge computing device, the data for data attributes and metadata included with the data.

At 328, the method 320 can include determining a data type of the data. For example, based on the analysis by the machine learning model, the edge computing device can determine the data type of the data to be autonomous vehicle data based on the data including log information for an autonomous vehicle. Additionally, at 330, the method 320 can include determining the geographic origin of the data to be India based on a geolocation tag included in metadata of the data. The edge computing device can further determine India does not include a compliance requirement for autonomous vehicle data.

Based on the data attributes indicating the data is autonomous vehicle data and the geolocation tag in the metadata indicating India does not include a compliance requirement for privatizing autonomous vehicle data, the edge computing device can transmit, at 332, the data as is (e.g., without being privatized) to the remote computing device.

Classification and transmission of data for data compliance, according to the disclosure, can therefore allow for the privatization of sensitive data before transmission from an edge computing device to a remote computing device, such as a centralized server system (e.g., a cloud-based computing system). The data can be privatized according to compliance requirements specific to the geographic location from which the data originated, allowing for compliance with data privacy regulations in many different geographic regions by ensuring data sovereignty while also benefiting from the reduced bandwidth and latency of an edge computing ecosystem. This approach can reduce the risk of financial penalties and reputational damage by ensuring sensitive data is handled according to regulatory compliance requirements, no matter the geographic location from which the data originated, as compared with previous approaches.

Figure 4:
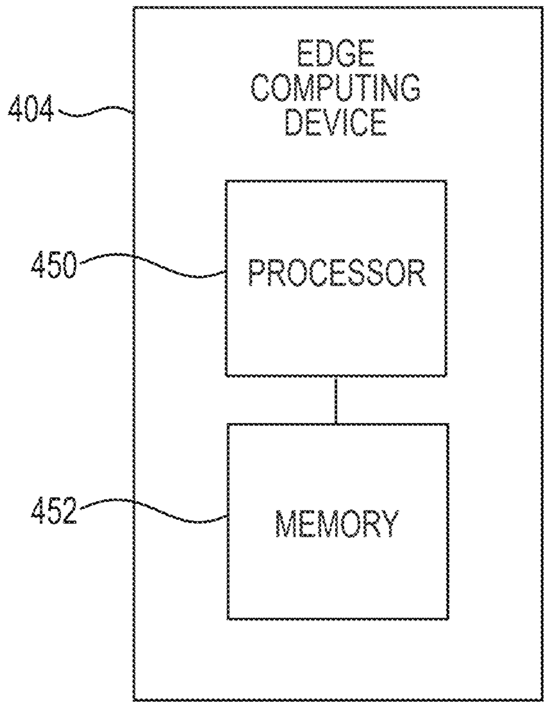
FIG. 4 is an example of an edge computing device for classification and transmission of data for data compliance in accordance with one or more embodiments.

FIG. 4 is an example of an edge computing device 404 for classification and transmission of data for data compliance in accordance with one or more embodiments. Edge computing device 404 can be, for example, edge computing device 104 previously described in connection with FIG. 1. As illustrated in FIG. 4, the edge computing device 404 can include a memory 452 and a processor 450 for classification and transmission of data for data compliance, in accordance with the present disclosure.

The memory 452 can be any type of storage medium that can be accessed by the processor 450 to perform various examples of the present disclosure. For example, the memory 452 can be a non-transitory computer readable medium having computer readable instructions (e.g., executable instructions/computer program instructions) stored thereon that are executable by the processor 450 for classification and transmission of data for data compliance in accordance with the present disclosure.

The memory 452 can be volatile or nonvolatile memory. The memory 452 can also be removable (e.g., portable) memory, or non-removable (e.g., internal) memory. For example, the memory 452 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 452 is illustrated as being located within edge computing device 404, embodiments of the present disclosure are not so limited. For example, memory 452 can also be located internal to another computing resource (e.g., enabling computer readable instructions to be downloaded over the Internet or another wired or wireless connection).

The processor 450 may be a central processing unit (CPU), a semiconductor-based microprocessor, and/or other hardware devices suitable for retrieval and execution of machine-readable instructions stored in the memory 452.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for classification and transmission of data for data compliance, comprising:

analyzing, by a machine learning model of an edge computing device, data received by the edge computing device from a terminal device for data attributes and metadata included with the data, wherein the metadata includes a geolocation tag;

classifying, by the machine learning model, the data as sensitive data based on:

the data attributes; and the geolocation tag in the metadata indicating a geographic origin of the data includes a compliance requirement for privatizing the data;

in response to the data being classified as sensitive data, privatizing, by the edge computing device, the data; and transmitting, by the edge computing device, the privatized data to a remote computing device.

2. The method of claim 1, wherein the method includes analyzing, by the machine learning model, the data using natural language processing.

3. The method of claim 1, wherein the method includes analyzing, by the machine learning model, the data using computer vision.

4. The method of claim 1, wherein the method includes privatizing, by the edge computing device, the data by masking the data.

5. The method of claim 1, wherein the method includes privatizing, by the edge computing device, the data by encrypting the data.

6. The method of claim 1, wherein the method includes privatizing, by the edge computing device, the data by pseudonymization or anonymization of the data.

7. The method of claim 1, wherein in response to the geolocation tag indicating the geographic origin does not include a compliance requirement, the method includes transmitting, by the edge computing device, the data to the remote computing device in a same state as a state in which the data was received from the terminal device.

8. An edge computing device for classification and transmission of data for data compliance, comprising:

a processing resource; and a memory resource storing non-transitory machine-readable instructions to cause the processing resource to:

analyze, by a machine learning model, data received from a terminal device for data attributes and metadata included with the data, wherein the metadata includes a geolocation tag;

classify, by machine learning model, the data as sensitive data based on:

the data attributes; and the geolocation tag in the metadata indicating a geographic origin of the data includes a compliance requirement for privatizing the data;

in response to the data being classified as sensitive data, privatize the data; and transmit the privatized data to a remote computing device.

9. The edge computing device of claim 8, wherein the processing resource is configured to determine the geographic origin of the data based on the geolocation tag included in the metadata.

10. The edge computing device of claim 8, wherein the processing resource is configured to:

determine a data type of the data based on the analyzed data;

classify the data based on the data type; and privatize the data via a privatization method corresponding to the data type in response to the data being classified as sensitive data.

11. The edge computing device of claim 8, wherein the processing resource is configured to log an instance of the data being classified as sensitive data in a database.

12. The edge computing device of claim 8, wherein the processing resource is configured to privatize a sensitive portion of the data.

13. The edge computing device of claim 8, wherein the machine learning model is a miniaturized machine learning model.

14. The edge computing device of claim 8, wherein the received data is structured data.

15. The edge computing device of claim 8, wherein the received data is unstructured data.

16. A non-transitory computer readable medium storing instructions executable by a processing resource to cause the processing resource to:

analyze, by a machine learning model, data received from a terminal device for data attributes and metadata included with the data, wherein the metadata includes a geolocation tag;

determine a data type of the data based on the analyzed data;

determine a geographic origin of the data based on the geolocation tag;

classify, by the machine learning model in response to the geographic origin of the data indicating a compliance requirement for privatizing the data, the data as sensitive data;

in response to the data being classified as sensitive data, privatize the data via a privatization method corresponding to the data type; and transmit the privatized data to a remote computing device.

17. The non-transitory computer readable medium of claim 16, comprising instructions to cause the processing resource to classify the data as sensitive data in response to the data including personal identifying information.

18. The non-transitory computer readable medium of claim 17, wherein the personal identifying information includes at least one of a name, biometric data, and personal identification number.

19. The non-transitory computer readable medium of claim 16, comprising instructions to cause the processing resource to classify the data as sensitive data in response to the data including financial information.

20. The non-transitory computer readable medium of claim 16, comprising instructions to cause the processing resource to classify the data as sensitive data in response to the data including medical information.

* * * * *